(12) United States Patent
Kim et al.

(10) Patent No.: US 10,059,837 B2
(45) Date of Patent: Aug. 28, 2018

(54) ACRYLIC PROCESSING AID AND VINYL CHLORIDE-BASED RESIN COMPOSITION COMPRISING SAME

(71) Applicant: LG Chem, Ltd., Seoul (KR)

(72) Inventors: Yoon Ho Kim, Daejeon (KR); Geon Soo Kim, Daejeon (KR); Kyung Bok Sun, Daejeon (KR)

(73) Assignee: LG Chem, Ltd. (KR)

( * ) Notice: Subject to any disclaimer, the term of this patent is extended or adjusted under 35 U.S.C. 154(b) by 43 days.

(21) Appl. No.: 15/320,821

(22) PCT Filed: May 11, 2016

(86) PCT No.: PCT/KR2016/004927
§ 371 (c)(1),
(2) Date: Dec. 21, 2016

(87) PCT Pub. No.: WO2016/182338
PCT Pub. Date: Nov. 17, 2016

(65) Prior Publication Data
US 2017/0198130 A1 Jul. 13, 2017

(30) Foreign Application Priority Data

May 13, 2015 (KR) .................. 10-2015-0066868

(51) Int. Cl.
*C08L 33/12* (2006.01)
*C08F 220/14* (2006.01)
*C08L 27/06* (2006.01)

(52) U.S. Cl.
CPC ............ *C08L 33/12* (2013.01); *C08F 220/14* (2013.01); *C08L 27/06* (2013.01)

(58) Field of Classification Search
CPC ...... C08L 33/12; C08L 27/06; C08L 2308/00; C08F 220/14; C08F 2/001
See application file for complete search history.

(56) References Cited

U.S. PATENT DOCUMENTS

| | | | |
|---|---|---|---|
| 6,537,724 B1* | 3/2003 | Lee et al. ............. | G03F 7/0392 430/270.1 |
| 6,621,685 B1* | 9/2003 | Cho et al. ............. | H01G 9/038 252/62.2 |
| 6,730,741 B1 | 5/2004 | Honda et al. | |
| 7,432,320 B2 | 10/2008 | Sakashita et al. | |
| 2004/0116580 A1 | 6/2004 | Sakashita et al. | |
| 2005/0203247 A1 | 9/2005 | Ahn et al. | |
| 2006/0194926 A1 | 8/2006 | Lee et al. | |
| 2011/0244240 A1 | 10/2011 | Kim et al. | |
| 2013/0115185 A1 | 5/2013 | Tamareselvy et al. | |
| 2013/0345362 A1 | 12/2013 | Maeda et al. | |
| 2016/0193384 A1* | 7/2016 | Phopase ................ | A61L 27/227 424/93.7 |

FOREIGN PATENT DOCUMENTS

| | | |
|---|---|---|
| JP | H06065459 A | 3/1994 |
| JP | H11005967 A | 1/1999 |
| JP | 2003128711 A | 5/2003 |
| JP | 2006524268 A | 10/2006 |
| KR | 20040047510 A | 6/2004 |
| KR | 20050069908 A | 7/2005 |
| KR | 20110040510 A | 4/2011 |
| WO | 0012621 A1 | 3/2000 |

OTHER PUBLICATIONS

International Search Report from PCT/KR2016/004927, dated Jul. 29, 2016.

* cited by examiner

*Primary Examiner* — Nathan M Nutter
(74) *Attorney, Agent, or Firm* — Lerner, David, Littenberg, Krumholz & Mentlik, LLP

(57) ABSTRACT

The present invention relates to an acrylic processing aid which may enhance the processability and dispersibility of a resin, a method of producing the same, a vinyl chloride-based resin composition including the same, and a vinyl chloride-based resin formed product derived from the vinyl chloride-based resin composition. An acrylic processing aid according to the present invention may be used as a processing aid for a resin (e.g., a vinyl chloride-based resin) to promote gelation of the resin to enhance the processability, thus suppressing generation of fish-eye, and in a forming processing (e.g., a calendar forming), may promote melting of the resin to suppress the generation of air marks and flow marks, thereby enhancing the surface characteristics of the produced resin. Therefore, the acrylic processing aid according to the present invention and the vinyl chloride-based resin formed product using the same may be applied easily in industries that require these, for example, industries associated with a processing aid for a resin and industries associated with a vinyl chloride-based resin.

16 Claims, 1 Drawing Sheet

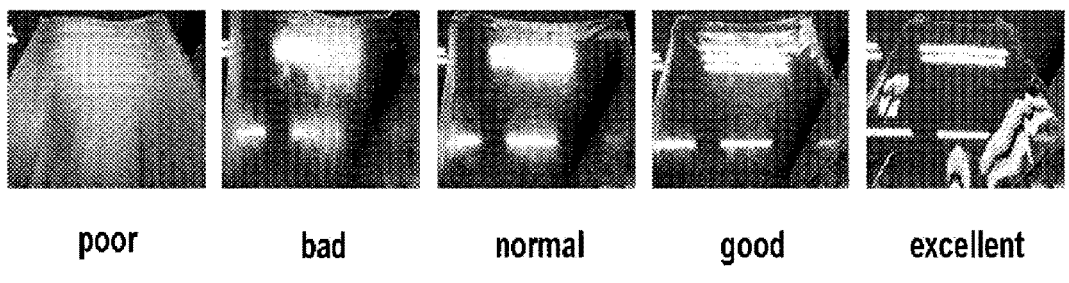

ACRYLIC PROCESSING AID AND VINYL CHLORIDE-BASED RESIN COMPOSITION COMPRISING SAME

CROSS-REFERENCE TO RELATED APPLICATIONS

The present application is a national phase entry under 35 U.S.C. § 371 of International Application No. PCT/KR2016/004927 filed May 11, 2016, which claims priority from Korean Patent Application No. 10-2015-0066868, filed on May 13, 2015, in the Korean Intellectual Property Office, the disclosures of which are incorporated herein.

TECHNICAL FIELD

Technical Field

The present invention relates to an acrylic processing aid which may improve the processability and dispersibility of a resin, a method for producing the same, a vinyl chloride-based resin composition including the same, and a vinyl chloride-based resin formed product derived from the vinyl chloride-based resin composition.

Background Art

Generally, a vinyl chloride-based resin is a resin containing 50% or more vinyl chloride, and since the vinyl chloride-based resin is inexpensive, it is easy to adjust the hardness thereof, and it is applicable to most of the processing units, it is applied to various fields. In addition, since the vinyl chloride-based resin is excellent in various kinds of physical properties and chemical properties, such as mechanical strength, weather resistance, chemical resistance, etc., it is widely used for various kinds of products such as building materials, household goods, car interiors, vanities etc. However, the vinyl chloride-based resin has several problems: the forming temperature range is narrow because the processing temperature is close to the thermal decomposing temperature, and a long time is required for a melt state thereof.

In order to solve the above problems, there are known a method of adding a plasticizer to a vinyl chloride resin, a method of using a vinyl chloride resin obtained by copolymerizing vinyl chloride monomers with other monomers such as vinyl acetate, etc., and a method of blending a vinyl chloride resin with another resin component.

However, the above-described methods have problems in that they have difficulties in sufficiently improving the processability with maintaining excellent physical and chemical properties which are inherent to the vinyl chloride resin. For example, in case of adding a plasticizer to a vinyl chloride resin, or using a vinyl chloride resin obtained by copolymerizing vinyl chloride monomers with other monomers, there is a problem in that physical properties of formed products changes drastically.

Also, most of the methods of blending a vinyl chloride resin with another resin component have a problem in that the melting viscosity in the processing of formed products is lowered to lower the processing temperature. Besides, since milling energy is consumed by flow of the resin during a processing operation, gelation of the vinyl chloride resin becomes insufficient and thus physical properties thereof are lowered compared with vinyl chloride-based resins which are sufficiently gelated.

Meanwhile, in order to promote the gelation or to improve the appearance of a forming product in the forming processing of a vinyl chloride-based resin, a method of mixing a copolymer having methyl methacrylate as a main component to a vinyl chloride resin is suggested. The method has advantages of improving the processability while maintaining mechanical properties and transparency of a vinyl chloride-based resin formed product having a high degree of gelation, and also has an advantage of reducing air marks generated when the copolymer mixed with the vinyl chloride-based resin is formed in a sheet by a calendar forming. However, the above method has a disadvantage of generating a flow mark on a surface of the sheet, resulting in degradation of the quality of a formed product.

Moreover, in recent years, with the improvement of forming and mixing technologies, the flow mark generated on the surface of the sheet is regarded as an important issue, and thus the development of techniques to reduce the flow mark is highly required.

For example, U.S. Pat. No. 6,730,741 discloses a method in which a copolymer having a molecular weight in the range of from 700,000 g/mol to 2,000,000 g/mol and comprising 70 to 90% by weight of methyl methacrylate, 10 to 30% by weight of acrylate or methacrylate other than methyl methacrylate; and a copolymer having a molecular weight in the range of from 100,000 g/mol to 500,000 g/mol and comprising at least 30% by weight of methyl methacrylate and one type of methacrylates other than methyl methacrylate, and acrylates are blended in latex conditions to improve the processability of a vinyl chloride resin and adjust the generation of fish-eye and flow marks. However, the method exhibits effects of decreasing the flow marks and improving the releasability of sheets from the surface of rolls but has a problem in which fish-eye may be still generated because the above-described effects are not sufficient.

Also, U.S. Pat. No. 7,432,320 discloses a processing aid for a vinyl chloride resin, having specific viscosity of at least 0.5, wherein the processing aid is obtained by polymerizing a (co)polymer (at a second step) obtained by polymerizing a monomer mixture (B), the monomer mixture (B) comprising 0-49% by weight of methyl methacrylate, 51-100% by weight of at least one monomer selected from the group consisting of a methacrylate ester except methyl methacrylate and an acrylate ester, and 0-20% by weight of a vinyl monomer copolymerizable therewith, in the presence of a (co)polymer (at a first step) having specific viscosity of at least 0.7 and obtained by polymerizing a monomer mixture (A), the monomer mixture (A) comprising 51-100% by weight of methyl methacrylate, 0-49% by weight of at least one monomer selected from the group consisting of a methacrylate ester except methyl methacrylate and an acrylate ester, and 0-20% by weight of a vinyl monomer copolymerizable therewith, the (co)polymer (at the second step) being formed as an outer layer on the (co)polymer (at the first step).

Since the processing aid includes the (co)polymer (at the first step: inner layer) the proportion of methacrylic acid methyl of which is high, and the (co)polymer (at the second step: outer layer) the proportion of acrylic compounds of which is high, the above patent may have effects of improving the gelation, processability and foamability of a vinyl chloride-based composition with only a small amount thereof, but the above US patent does not disclose influence on flow marks or adhesion property in calendar forming.

Also, Korean Patent Laid-open Publication No. 10-2011-0040510 discloses an acrylic composition having a glass transition temperature of 10° C. to 55° C., the acrylic composition comprising: 0.1-30 parts by weight of a first polymer having a glass transition temperature of −10° C. or lower and a relative viscosity of 1.2 to 10, and 70-99.9 parts by weight of a second polymer, the first polymer being formed by polymerizing at least one among methyl methacrylate monomer, alkylacrylate monomer and alkyl methacrylate, and the second polymer being formed by polymerizing at least one among methyl methacrylate monomer, alkylacrylate monomer and alkyl methacrylate monomer. The composition is produced by controlling the glass transition temperature and the relative viscosity of the first polymer and the second polymer, the above patent has effects of improving the foamability, fish-eye property and mechanical property of vinyl chloride-based resins but does not disclose effects about flow marks in calendar forming.

Therefore, in order to easily apply vinyl chloride-based resins to various fields, there is a need for developing a processing aid, which may suppress the generation of fish-eye and at the same time, which may suppress the generation of air marks and flow marks and the increase of viscosity in forming processing.

PRIOR ART DOCUMENTS (Patent Document 1) U.S. Pat. No. 6,730,741 B1
(Patent Document 2) U.S. Pat. No. 7,432,320 B1
(Patent Document 3) KR 10-2011-0040510 A

DISCLOSURE OF THE INVENTION

Technical Problem

The present invention has been devised in consideration of the above-mentioned problems, and an object of the present invention is to provide an acrylic processing aid which may improve the processability of a resin such as a vinyl chloride-based resin, suppress the generation of air marks and flow marks in forming processing of a resin, such as a calendar forming, and improve the adhesion resistance of the resin.

Another object of the present invention is to provide a method for producing the above-described acrylic processing aid.

A further object of the present invention is to provide a vinyl chloride-based resin composition comprising the above-described acrylic processing aid, and a resin formed product derived from the vinyl chloride-based resin composition.

Technical Solution

To solve the above-described problem, the present invention provides an acrylic processing aid including 75 wt % to 95 wt % of a first copolymer; and 5 wt % to 25 wt % of a second copolymer, the second copolymer including a polyethylene glycol-based monomer represented by the Formula 1.

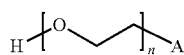

[Formula 1]

In Formula 1, A is an acrylate or a methacrylate, and n is an integer from 3 to 14.

The present invention also provides a method of producing an acrylic processing aid, the method including: a step (step 1) of producing a first copolymer latex having a weight average molecular weight (mw) of 1,000,000 to 2,000,000; and a step (step 2) of produce a second copolymer latex having a weight average molecular weight (mw) of 400,000 to 800,000 by mixing 5 wt % to 25 wt % of a monomer mixture to 75 wt % to 95 wt % of the first copolymer and then polymerizing.

In addition, the present invention provides a vinyl chloride-based resin composition including 100 parts by weight of a vinyl chloride-based resin; 0.1-5 parts by weight of the acrylic processing aid; and a vinyl chloride-based resin formed product derived from the vinyl chloride-based resin composition.

Advantageous Effects

An acrylic processing aid according to the present invention is used as a processing aid for a resin (for example, a vinyl chloride-based resin) to promote the gelation of the resin to enhance the processability, thus capable of suppressing the generation of fish-eye, and in a forming processing (for example, a calendar forming) may promote melting of the resin to suppress the generation of air marks and flow marks, thereby enhancing the surface characteristics of the produced resin.

In addition, since a vinyl chloride-based resin formed product according to the present invention is produced by using the acrylic processing aid, the processability is enhanced, thus resulting in less generation of fish-eye, the surface characteristics are enhanced, so air marks and flow marks are scarcely generated, and adhesion resistance may be enhanced.

Therefore, the acrylic processing aid and the vinyl chloride-based resin formed product may be applied easily to industries associated with a processing aid of a resin and industries associated with a vinyl chloride-based resin.

BRIEF DESCRIPTION OF THE DRAWINGS

The following accompanying drawings are intended to illustrate preferred embodiments of the present invention and are included to provide a further understanding of the technical idea of the present invention together with the description of the invention, and therefore the invention should not be construed to be limited to only items described in the drawings.

The FIGURE shows images for the processability evaluation criteria of polyvinyl chloride resin sheets according to an embodiment of the present invention.

MODE FOR CARRYING OUT THE INVENTION

The present invention will now be described in more detail in order to help the understanding of the present invention.

The terms and words used in the following description and claims are not limited to the typical or bibliographical meanings, but, should be construed to be meanings and concepts consistent to the technical idea of the present invention under the principle in which the inventor may properly define the concepts of the terms to explain the invention thereof in a best way.

The present invention provides an acrylic processing aid, which may provide the excellent processability and dispersibility to a resin, for example, a vinyl chloride-based resin.

The acrylic processing aid according to an embodiment of the present invention is characterized by including 75 wt % to 95 wt % of a first copolymer; and 5 wt % to 25 wt % of a second copolymer.

Also, the second copolymer is characterized by including a polyethylene glycol (PEG)-based monomer represented by Formula 1.

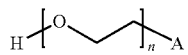

[Formula 1]

In Formula 1, A is an acrylate or a methacrylate, and n is an integer from 3 to 14. Specifically, the A is methacrylate and n is an integer from 3 to 14.

Hereinafter, the acrylic processing aid according to an embodiment of the present invention will be described in more detail.

The acrylic processing aid as described above may be an acrylic processing aid including 75 wt % to 95 wt % of a first copolymer; and 5 wt % to 25 wt % of a second copolymer, the second copolymer being located on an outer surface of the first copolymer. That is, the acrylic processing aid according to an embodiment of the present invention may be an acrylic processing aid which includes a first copolymer and a second copolymer which are separate from each other but has a core-shell structure in which the second copolymer is located on the outer surface of the first copolymer, i.e., the first copolymer is an inner layer and the second copolymer is an outer layer.

The first copolymer may have an average particle diameter ($D_{50}$) in a range of 130 nm to 230 nm, and the acrylic processing aid may have an average particle diameter ($D_{50}$) in a range of 150 nm to 250 nm. Herein, the average particle diameter of the acrylic processing aid may be an average particle diameter as having the core-shell structure in which the first copolymer is an inner layer and the second copolymer is an outer layer as described above.

In this regard, the average particle diameter may be the value measured using the Submicron Particle Sizer (NICOM 380, Particle Sizing Systems).

The first copolymer may be an acrylic polymer which includes polymerizing methyl methacrylate and an acrylic acid alkyl ester-based monomer for polymerization. According to need, the first copolymer may be an acrylic polymer in which an aromatic vinyl monomer is further added for polymerization. Specifically, the first copolymer may include 70 wt % to 99 wt % of methyl methacrylate; 1 wt % to 30 wt % of an acrylic acid alkyl ester-based monomer; and 0 wt % to 20 wt % of an aromatic vinyl monomer.

Also, the first copolymer has a weight average molecular weight (Mw) of 1,000,000 to 2,000,000.

The methyl methacrylate (MMA) represented by Formula 2 is a methyl ester compound of methacrylic acid, and may be included in the first copolymer to provide the processability to the acrylic processing aid including the same.

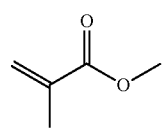

[Formula 2]

The first copolymer according to an embodiment of the present invention may include 70 wt % to 99 wt % of methyl methacrylate. If the methyl methacrylate is less than 70 wt %, the processability enhancement effect of a resin (e.g., a vinyl chloride-based resin) produced using a processing aid including the same may be insignificant.

The acrylic acid alkyl ester-based monomer is a compound represented by Formula 3, and may be included in the first copolymer to control the glass transition temperature (Tg) of the acrylic processing aid and to thus promote the melting of the acrylic processing aid.

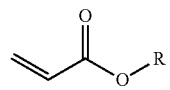

[Formula 3]

In the formula 3, R may represent an alkyl group.

The first copolymer according to an embodiment of the present invention may include 1 wt % to 10 wt % of the acrylic acid alkyl ester-based monomer. If the amount of the acrylic acid alkyl ester-based monomer exceeds 10 wt %, the amount of the methyl methacrylate included in the first copolymer is decreased relatively and thus the processability of a resin (e.g., a vinyl chloride-based resin) which is produced using a processing aid including the same (for example, vinyl chloride-based resin) may be lowered.

The acrylic acid alkyl ester-based monomer is not particularly limited so long as it has the structure of Formula 3, and the acrylic acid alkyl ester-based monomer may be, for example at least one selected from the group consisting of methyl acrylate, ethyl acrylate, n-butyl acrylate, lauryl acrylate, stearyl acrylate, 2-ethyl hexyl acrylate, and cyclohexyl acrylate. Particularly, the acrylic acid alkyl ester-based monomer may be an n-butyl acrylate.

Meanwhile, the first copolymer may include less than 20 wt % of aromatic vinyl monomer according to needs, and specifically, may include 0.01 wt % to 20 wt % of an aromatic vinyl monomer.

The aromatic vinyl monomer is not particularly limited and may be a typical material known in the art, for example, at least one selected from the group consisting of styrene, α-methylstyrene, t-butylstyrene, chlorostyrene, and p-methylstyrene.

The second copolymer may be located on the outer surface of the first copolymer as described above, wherein the first copolymer may not be cross-linked with the second copolymer and may exist as a separate copolymer. The first copolymer may be a polymer of an acrylic acid alkyl ester-based monomer and a polyethylene glycol (PEG)-based monomer represented by Formula 1 below and may further include an aromatic vinyl monomer according to needs. Specifically, the second copolymer may include 60 wt % to 80 wt % of an acrylic acid alkyl ester-based monomer; 20 wt % to 40% of a polyethylene glycol-based monomer represented by Formula 1 below; and 0 wt % to 20 wt % of an aromatic vinyl monomer.

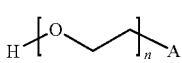

[Formula 1]

In Formula 1, A is an acrylate or a methacrylate, and n is an integer from 3 to 14.

Also, the second copolymer may have a weight average molecular weight (Mw) of 400,000 to 800,000.

The acrylic acid alkyl ester-based monomer may be included in the second copolymer to provide the excellent the dispersibility to the acrylic processing aid including the same, and the specific structure and substance thereof may be the same as or included in those described above. Also, the acrylic acid alkyl ester-based monomer may be included in an amount of 60 wt % to 80 wt % in the acrylic shell as described above. If the acrylic acid alkyl ester-based monomer is included in an amount of less than 50 wt %, the dispersibility of an acrylic processing aid including the same to a resin (e.g., a vinyl chloride-based resin) may be lowered and the fish-eye property of a finally produced resin (e.g., a vinyl chloride-based resin) may not be good. On the contrary, if the amount of the included acrylic acid alkyl ester-based monomer exceeds 80 wt %, the amount of the polyethylene glycol-based monomer in the second copolymer is relatively lowered, and untargeted large particles may be formed during agglomeration due to a low glass transition temperature (Tg) and adhesion resistance may be lowered.

The polyethylene glycol-based monomer represented by Formula 1 above may be included in the second copolymer to enhance the adhesion resistance of the second copolymer. A specific example of the polyethylene glycol-based monomer represented by Formula 1 above may be a polyethylene glycol methacrylate, a polyethylene glycol acrylate or a combination thereof, and the number of repeat units thereof may be 3 to 14 as described above.

The polyethylene glycol-based monomer represented by Formula 1 above may be included in an amount of 20 wt % to 40 wt % in the acrylic shell as described above. If the polyethylene glycol-based monomer represented by Formula 1 above is included in an amount of less than 20 wt %, the improvement effect of adhesion may be insignificant, and if the polyethylene glycol-based monomer represented by Formula 1 above is included in an amount of more than 40 wt %, the amount of the acrylic acid alkyl ester-based monomer in the second copolymer may be excessively lowered and the dispersibility property of the acrylic processing aid including the same may be lowered.

Meanwhile, the second polymer according to an embodiment of the present invention may further include 20 wt % or less of an aromatic vinyl monomer, and specifically, may further include 0.01 wt % to 20 wt % of the aromatic vinyl monomer. In this regard, the aromatic vinyl monomer may be the same as or be included in that mentioned above.

Also, the acrylic processing aid according to an embodiment of the present invention is not particularly limited and may be used in various resins, which need to improve the processability, for example, a thermoplastic resin. Specifically, the acrylic processing aid may be easily used as an acrylic processing aid for a vinyl chloride-based resin.

The acrylic processing aid according to the present invention has not only excellent dispersibility to a resin (e.g., vinyl chloride-based resin) but also promote gelation of a resin (e.g., vinyl chloride-based resin) produced using the same to enhance the processability and suppress the generation of fish-eye. Also, in a forming processing such as a calendar forming, the acrylic processing aid may promote the melting of the resin to effectively reduce air marks and flow marks on the surface of a produced formed product, thereby improving the surface characteristics.

Also, the present invention provides a method of producing the acrylic processing aid. The method of producing the acrylic processing aid according to an embodiment of the present invention is not particularly limited and may be a method such as emulsion polymerization, suspension polymerization, solution polymerization or the like commonly known in the art.

Specifically, the producing method is characterized by including a step (step 1) of producing a first copolymer having a weight average molecular weight (mw) of 1,000,000 to 2,000,000; and a step (step 2) of mixing 5 wt % to 25 wt % of a monomer mixture to 75 wt % to 95 wt % of the first copolymer and then polymerizing to produce a second copolymer having a weight average molecular weight (mw) of 400,000 to 800,000.

The producing method according to an embodiment of the present invention may produce an acrylic processing aid having excellent processability and excellent flow mark property by controlling weight average molecular weights of the first copolymer and the second copolymer in the range described above. If the weight average molecular weight of the first copolymer is out of the range and excessively high, the processability may be enhanced but the flow characteristics may be lowered, and if the weight average molecular weight of the first copolymer is out of the range and so low, the processability may be lowered.

The step 1 is a method for producing the first copolymer and may be conducted by polymerization of methacrylate and an acrylic acid ester-based monomer.

Specifically, the first copolymer may be produced by an emulsion polymerization of 70 wt % to 99 wt % of methyl methacrylate and 1 wt % to 10 wt % of an acrylic acid alkyl ester-based monomer. Also, according to needs, 0 wt % to 20 wt % of an aromatic vinyl monomer may be added for polymerization.

The emulsion polymerization is not particularly limited and may be conducted by a method commonly known in the art, for example, a method in which methyl methacrylate, an acrylic acid alkyl ester-based monomer, deionized water, an emulsifier, and a polymerization initiator are added in a batch in a reactor to conduct a reaction or are added successively according to the points of polymerization conversion rates.

Specifically, the emulsion polymerization may be conducted by a method including a step of loading 70 parts by weight to 200 parts by weight of deionized water, 0.3 parts by weight to 5 parts by weight of an emulsifier, 0.001 parts by weight to 0.3 parts by weight of a polymerization initiator into a polymerization reactor in a batch with respect to 100 parts by weight of a mixture of methyl methacrylate and an acrylic alkyl ester-based monomer (or a mixture of methyl methacrylate, an acrylic alkyl ester-based monomer, and an aromatic vinyl monomer), and conducting a reaction at a temperature ranging from 50° C. to 90° C. In this case, the methyl methacrylate and the acrylic acid alkyl ester-based monomer are added in a batch with another constituent material or additive to conduct a reaction or may be added dividedly several times or successively during the polymerization reaction.

The acrylic acid alkyl ester-based monomer may be the same as or included in that described above.

The emulsifier is not particularly limited if it is a typical one known in the art, and may be at least one selected from the group consisting of alkyl aryl sulfonate, alkali methyl alkyl sulfate, sulfonated alkyl ester, soap of a fatty acid, and an alkali salt of a rosin acid.

The polymerization initiator is not particularly limited if it is a typical one known in the art, and may be a water-soluble sulfate-based polymerization initiator such as potassium persulfate, sodium persulfate or ammonium persulfate, and a redox-based polymerization initiator containing, as one component, a peroxide such as hydrogen peroxide, cumene hydroperoxide, diisopropylbenzene hydroperoxide, tert-butyl hydroperoxide, para-menthane hydroperoxide or the like, the water-soluble sulfate-based polymerization initiator and the redox-based polymerization initiator being used alone or in combination.

The step 2 is a step for obtaining an acrylic processing aid by forming the second copolymer on the outer surface of the first copolymer, and may be conducted by polymerizing an acrylic acid alkyl ester-based monomer forming the second copolymer in the presence of the first copolymer and a polyethylene glycol-based monomer represented by Formula 1.

Specifically, the second copolymer may be produced by polymerizing 5 wt % to 25 wt % of a monomer mixture forming the second copolymer in the presence of 75 wt % to 95% of the first copolymer, in which the monomer mixture may be a mixture which includes 60 wt % to 80 wt % of an acrylic acid alkyl ester-based monomer, 20 wt % to 40 wt % of a polyethylene glycol-based monomer represented by Formula 1 above with respect to 100 wt % of the monomer mixture. Also 0 wt % to 20 wt % of an aromatic vinyl monomer may be added according to needs.

Also, in order to conduct the graft copolymerization easily, additives such as an emulsifier, a polymerization initiator, etc. may be additively used and specific examples of the additives may be same as those mentioned above.

The producing method according to an embodiment of the present invention may further include at least one of agglomeration, washing with water, dehydration, and drying after step 2.

The agglomeration is not particularly limited, and for example, may be conducted by adding an aggregating agent at the temperature ranging from 30° C. to 60° C. In this case, the aggregating agent is added successively for a constant time, is added in a batch or is added several times dividedly with equal amounts.

The agglomerating agent may include a metal salt such as magnesium chloride, calcium chloride, magnesium sulfate, or the like, an inorganic acid such as a hydrochloric acid, a sulfuric acid, a phosphoric acid, an acetic acid or the like, and an inorganic acid, but be not limited to.

The washing with water, dehydration, and drying are not particularly limited and may be conducted by common methods known in the art.

Also, the present invention provides a vinyl chloride-based composition which includes the acrylic processing aid.

The vinyl chloride-based resin composition according to an embodiment of the present invention is characterized by including: 100 parts by weight of a vinyl chloride-based resin; and 0.1 parts by weight to 5 parts by weight of the acrylic processing aid.

As used herein, the term "composition" indicates a material made of several components, and may mean a state in which several components are mixed, and a state in which several components are mixed and agglomerated.

The vinyl chloride-based resin may include a copolymer of s vinyl chloride monomer functioning as a main component and a vinyl-based monomer copolymerizable with the vinyl chloride monomer, as well as a polymer formed of vinyl chloride monomers alone. In this regard, in a case that the vinyl chloride-based resin is a copolymer of a vinyl chloride monomer and a vinyl-based monomer, it is preferable that vinyl chloride be included in the copolymer in an amount of 50% or more.

The vinyl-based monomers copolymerizable with the vinyl chloride-based monomer are not particularly limited, but may be olefin compounds such as ethylene, propylene, butene etc., vinyl esters such as vinyl acetate, vinyl propionate, vinyl stearate etc., unsaturated nitriles such as acrylonitrile etc., vinyl alkyl ethers such as vinyl methyl ether, vinyl ethyl ether, vinyl octyl ether, vinyl lauryl ether etc., halogenated vinylidenes such as vinylidene chloride etc., acrylic acid, methacrylic, such as vinylidene chloride, unsaturated fatty acids such as an acrylic acid, a methacrylic acid, an itaconic acid, a maleic acid, a fumaric acid, maleic anhydride, itaconic anhydride etc. and anhydrides of these fatty acids, unsaturated fatty acid esters such as methyl acrylate, ethyl acrylate, maleic acid monomethyl, maleic acid dimethyl, maleic acid butyl benzyl etc., or cross-linking monomers such as diallyl phthalate, and the vinyl-based monomers may be used alone or in combination of two or more.

Further, the present invention provides a vinyl chloride-based resin formed product derived from the vinyl chloride-based resin composition.

The term "derived from the vinyl chloride-based resin composition" used herein may be construed as meanings of 'produced from a vinyl chloride-based resin composition', or produced by processing a vinyl chloride-based resin composition. Also, the term "a vinyl chloride-based resin formed product" may indicate any product produced by processing the composition and having a specific shape or a vinyl chloride-based resin generally produced from the composition.

The vinyl chloride-based resin formed product according to the present invention may have excellent surface characteristics because it uses the above-described acrylic processing aid as a processing aid to reduce the generation of fish-eye, air marks, and flow marks and to enhance the adhesion resistance.

Hereinafter, the present invention will be described in more detail through Examples and Experimental Examples. However, the Examples and Experimental Examples below are intended to illustrate the present invention and not intended to limit the scope of the invention only thereto.

The unit "parts by weight" used in Examples refers to a weight ratio of each component when it is assumed that the sum of weights of all monomers used in producing an acrylic processing acid is 100 parts by weight, in which all the monomers include methyl methacrylate, n-butyl acrylate, and polyethylene glycol methacrylate.

Example 1

To an 8 L polymerization reactor equipped with an agitator were added 50 parts by weight of deionized water and 0.1 parts by weight of sodium lauryl sulfate, and the inside of the polymerization reactor was replaced enough with a nitrogen gas, followed by elevating the inner temperature of the polymerization reactor to 75° C. Then, 80 parts by weight of methyl methacrylate and 5 parts by weight of n-butyl acrylate were mixed with 85 parts by weight of deionized water and 0.25 part by weight of sodium lauryl sulfate to obtain a mixture, and then the mixture obtained was added successively in the reactor together with 0.03 part by weight of potassium persulfate for 3 hours. A further reaction was conducted at 75° C., i.e., the inner temperature of the reactor for 0.5 hour to produce a first copolymer latex.

Next, to the reactor which contains the first copolymer latex, a mixture in which 10 parts by weight of n-butyl acrylate and 5 parts by weight of polyethylene glycol methacrylate (n=6, Mn=360) were mixed with 15 parts by weight of deionized water and 0.15 parts by weight of sodium lauryl sulfate, was added successively together with 0.02 parts by weight of potassium persulfate for 1 hour and a further reaction was conducted for 0.5 hour under the same temperature condition to produce an acrylic processing aid latex in which a second copolymer is formed on the outer surface of the first copolymer. In this regard, the polymerization conversion rate of the acrylic processing aid latex was 98% and the average particle diameter of the acrylic processing aid in the latex was 180 nm.

The obtained acrylic processing aid latex was treated with calcium chloride for agglomeration, was washed with water, and dried to obtain acrylic processing aid powder.

Example 2

Acrylic processing aid powder was obtained by the same method as that of Example 1 except that 12 parts by weight of n-butyl acrylate and 3 parts by weight of polyethylene glycol methacrylate were used in the step of forming an acrylic shell.

Example 3

Acrylic processing aid powder was obtained by the same method as that of Example 1 except that 9 parts by weight of n-butyl acrylate and 6 parts by weight of polyethylene glycol methacrylate were used in the step of forming an acrylic shell.

Comparative Example 1

Acrylic processing aid powder was obtained by the same method as that of Example 1 except that 15 parts by weight of n-butyl acrylate was used in the step of forming an acrylic shell and polyethylene glycol methacrylate was not used.

Comparative Example 2

Acrylic processing aid powder was obtained by the same method as that of Example 1 except that 13.5 parts by weight of n-butyl acrylate and 1.5 parts by weight of polyethylene glycol methacrylate were used in the step of forming an acrylic shell.

Comparative Example 3

Acrylic processing aid powder was obtained by the same method as that of Example 1 except that 7.5 parts by weight of n-butyl acrylate and 7.5 parts by weight of polyethylene glycol methacrylate were used in the step of forming an acrylic shell.

Experimental Example

To compare and analyze the characteristics of each of the acrylic processing aids produced by Examples 1 to 3 and Comparative Examples 1 to 3 as a processing aid, vinyl chloride-based resin specimens containing the respective acrylic processing aid powders were produced to compare and analyze the generation degrees of fish-eye, air marks, and flow marks, and the adhesion resistance. The results are shown in Table 1 below.

1) Measurement of Characteristics of Fish-Eye

Polyvinyl chloride resin compositions were produced by mixing 100 g of a polyvinyl chloride resin compound with 50 parts by weight of dioctylphthalate (DOP) and 10 parts by weight of each of the acrylic processing aids in Examples 1 to 3 and Comparative Example 1 to 3 with respect to 100 parts by weight of the polyvinyl chloride resin compound. The polyvinyl chloride resin compound is a mixture of 100 parts by weight of a polyvinyl resin (LS-080S, LG Chem.), 1.5 parts by weight of a tin-based heat stabilizer (OT-700R, Songwon Industry), 1 part by weight of lubricant A (G-16, Loxiol), and 0.5 part by weight of lubricant B (G-70S, Loxiol). The produced polyvinyl chloride resin compositions were processed in 6 inch 2-roll at a rotational speed of 20 rpm, with the friction of −15% at 180° C. for 2 minutes to produce sheets with the thickness of 0.5 mm, and the number of fish-eyes in the center regions of the sheets with the area of 10 cm×10 cm was observed. It is considered that the larger the number, the worse the processability.

2) Measurement of Characteristics of Flow Marks

Polyvinyl chloride resin compositions were produced by mixing 150 g of a polyvinyl chloride resin compound with 2 parts by weight of each of the acrylic processing aid powders in Examples 1 to 3 and Comparative Example 1 to 3 with respect to 100 parts by weight of the polyvinyl chloride resin compound. The polyvinyl chloride resin compound is a mixture of 100 parts by weight of a polyvinyl resin (LS-080S, LG Chem.), 1.5 parts by weight of a tin-based heat stabilizer (OT-700R, Songwon Industry), 1 part by weight of lubricant A (G-16, Loxiol), 0.5 part by weight of lubricant B (G-70S, Loxiol). The polyvinyl chloride resin compositions were processed in 6 inch 2-roll at a rotational speed of 15 rpm with the friction of 0% at 200° C. for 3 minutes to produce sheets with the thickness of 0.5 mm, and the lengths of the sheets were measured. It is considered that the shorter the length, the worse the characteristics of the flow marks.

3) Measurement of Processability

Polyvinyl chloride resin compositions were produced by mixing 150 g of a polyvinyl chloride resin compound with 2 parts by weight of each of the acrylic processing aid powders in Examples 1 to 3 and Comparative Example 1 to 3 with respect to 100 parts by weight of the polyvinyl chloride resin compound. The polyvinyl chloride resin compound is a mixture of 100 parts by weight of a polyvinyl resin (LS-080S, LG Chem.), 1.5 parts by weight of a tin-based heat stabilizer (OT-700R, Songwon Industry), 1 part by weight of lubricant A (G-16, Loxiol), 0.5 part by weight of lubricant B (G-70S, Loxiol). The polyvinyl chloride resin compositions were processed in 6 inch 2-roll at a rotational speed of 20 rpm with the friction of −10% at 185° C. for 3 minutes to produce sheets with the thickness of 0.5 mm.

The produced sheets were evaluated according to the surface conditions thereof, and the evaluation standard is shown in the FIGURE.

4) Measurement of Adhesion

Polyvinyl chloride resin compositions were produced by mixing 150 g of a polyvinyl chloride resin compound with 5 parts by weight of each of the acrylic processing aid powders in Examples 1 to 3 and Comparative Example 1 to 3 with respect to 100 parts by weight of the polyvinyl chloride resin compound. The polyvinyl chloride resin compound is a mixture of 100 parts by weight of a polyvinyl resin (LS-080S, LG Chem.), 1.5 parts by weight of a tin-based heat stabilizer (OT-700R, Songwon Industry), 1 part by weight of lubricant A (G-16, Loxiol), 0.5 part by weight of lubricant B (G-70S, Loxiol). The polyvinyl chloride resin compositions were processed at a roll rotation speed of 15 rpm with the friction of 0% at 200° C. for 3 minutes to produce sheets with the thickness of 0.5 mm. Each of the produced sheets was processed through a processing repeated 5 times without washing with water.

The adhesion was evaluated based on a ratio of thickness between the sheet with the first processing and the sheet with the fifth processing. It is considered that the closer to 100%, the lower the adhesion.

TABLE 1

| Item | Example 1 | Example 2 | Example 3 | Comparative Example 1 | Comparative Example 2 | Comparative Example 3 |
|---|---|---|---|---|---|---|
| Characteristic of Fish-eye (no.) | 10 | 8 | 12 | 6 | 8 | 40 |
| Characteristic of Flow mark (cm) | 65 | 66 | 64 | 69 | 68 | 59 |
| Processability | excellent | excellent | excellent | good | good | bad |
| Adhesion (%) | 105 | 107 | 103 | 145 | 138 | 105 |

As shown in Table 1, each of the polyvinyl chloride resin sheets of Examples 1 to 3 produced by using acrylic processing acids according to embodiments of the present invention shows excellent characteristics in fish-eye, flow mark, processability, and adhesion compared to each of the polyvinyl chloride resin sheets produced by using acrylic processing acids of Comparative Examples 1 to 3.

Specifically, the polyvinyl chloride-based resin sheet produced by using the acrylic acid processing aid of Comparative Example 1 which does not include a polyethylene glycol-based monomer, and the polyvinyl chloride resin sheet produced by using the acrylic processing acid of Comparative Example 2 which includes a polyethylene glycol-based monomer in an amount of less than the minimum amount percentage (20 wt %) suggested in an embodiment of the present invention show similar levels in the characteristics of fish-eye and flow mark but show low processability and the ratio of adhesion deviated significantly from 100%, compared to the polyvinyl chloride resin sheets produced by using the acrylic processing aids of Examples 1 to 3. This result shows that strong adhesion occurs during the processing to lower the adhesion resistance.

Also, the polyvinyl chloride resin sheet produced by using the acrylic processing acid of Comparative Example 3 which includes a polyethylene glycol-based monomer in an amount of more than the maximum amount (40 wt %) suggested in an embodiment of the present invention has 3.3 times to 5 times more fish-eye, and shows processability and flow mark characteristic degraded remarkably compared to the polyvinyl chloride resin sheets produced by using the acrylic processing aids of Examples 1 to 3.

As shown in the result, the acrylic processing aid according to an embodiment of the present invention includes the polyethylene glycol-based monomer in a specific amount, and thus has effects of enhancing the characteristics of fish-eye and flow mark, the processability, and the adhesion resistance.

The invention claimed is:

1. An acrylic processing aid comprising:
75 wt % to 95 wt % of a first copolymer; and 5 wt % to 25 wt % of a second copolymer, wherein the second copolymer includes 60 wt % to 80 wt % of an acrylic acid alkyl ester-based monomer, 20 wt % to 40% of a polyethylene glycol-based monomer represented by Formula 1 below, and 0 wt % to 20 wt % of an aromatic vinyl monomer,

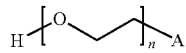
[Formula 1]

wherein A is an acrylate or a methacrylate, and n is an integer from 3 to 14.

2. The acrylic processing aid of claim 1, wherein, in the Formula 1, A is a methacrylate and n is an integer from 3 to 14.

3. The acrylic processing aid of claim 1, wherein the first copolymer comprises 70 wt % to 99 wt % of methyl methacrylate; 1 wt % to 30 wt % of an acrylic acid alkyl ester-based monomer; and 0 wt % to 20 wt % of an aromatic vinyl monomer.

4. The acrylic processing aid of claim 3, wherein the acrylic acid alkyl ester-based monomer is at least one selected from the group consisting of methyl acrylate, ethyl acrylate, n-butyl acrylate, lauryl acrylate, stearyl acrylate, 2-ethyl hexyl acrylate, and cyclohexyl acrylate.

5. The acrylic processing aid of claim 3, wherein the aromatic vinyl monomer is at least one selected from the group consisting of styrene, α-methyl styrene, t-butyl styrene, chloro styrene, and p-methyl styrene.

6. The acrylic processing aid of claim 1, wherein the first copolymer has a weight average molecular weight (Mw) of 1,000,000 to 2,000,000.

7. The acrylic processing aid of claim 1, wherein the second copolymer has a weight average molecular weight (Mw) of 400,000 to 800,000.

8. The acrylic processing aid of claim 1, wherein the acrylic processing aid is an acrylic processing aid for a vinyl chloride-based resin.

9. A method for producing the acrylic processing aid as set forth in claim 1, the method comprising the steps of:
1) producing a first copolymer having a weight average molecular weight (mw) of 1,000,000 to 2,000,000; and
2) adding 5 wt % to 25 wt % of a monomer mixture to 75 wt % to 95 wt % of the first copolymer, and then polymerizing to produce a second copolymer having a weight average molecular weight (mw) of 400,000 to 800,000.

10. The method of claim 9, wherein the first copolymer latex of step 1) is produced by polymerizing 70 wt % to 99 wt % of methyl methacrylate, 1 wt % to 30 wt % of an acrylic acid alkyl ester-based monomer and 0 wt % to 20 wt % of an aromatic vinyl monomer.

11. The method of claim 9, wherein the monomer mixture of step 2) is a mixture in which 60 wt % to 80 wt % of an acrylic acid alkyl ester-based monomer; 20 wt % to 40 wt % of a polyethylene glycol-based monomer represented by the following Formula 1; and 0 wt % to 20 wt % of an aromatic vinyl monomer are mixed in terms of 100 wt % of the monomer mixture,

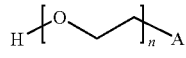
[Formula 1]

wherein A is an acrylate or a methacrylate, and n is an integer from 3 to 14.

12. The method of claim 9, further comprising, after the step 2), at least one step among cohesion, washing with water, and drying.

13. A vinyl chloride-based resin composition comprising 100 parts by weight of a vinyl chloride-based resin; and 0.1 to 5 parts by weight of the acrylic processing aid as set forth in claim 1.

14. A vinyl chloride-based resin formed product derived from the vinyl chloride-based resin composition of claim 13.

15. The acrylic processing aid of claim 1, wherein the acrylic acid alkyl ester-based monomer is at least one selected from the group consisting of methyl acrylate, ethyl acrylate, n-butyl acrylate, lauryl acrylate, stearyl acrylate, 2-ethyl hexyl acrylate, and cyclohexyl acrylate.

16. The acrylic processing aid of claim 1, wherein the aromatic vinyl monomer is at least one selected from the group consisting of styrene, α-methyl styrene, t-butyl styrene, chloro styrene, and p-methyl styrene.

* * * * *